Aug. 31, 1948.  C. B. RICHEY  2,448,123
CIRCULAR SAW ATTACHMENT FOR TRACTORS
Filed June 20, 1945  2 Sheets-Sheet 1
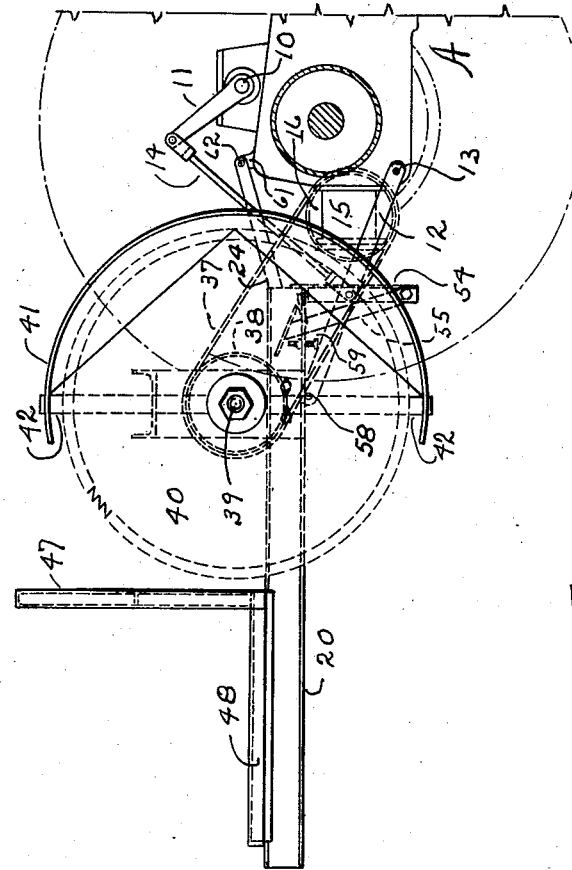
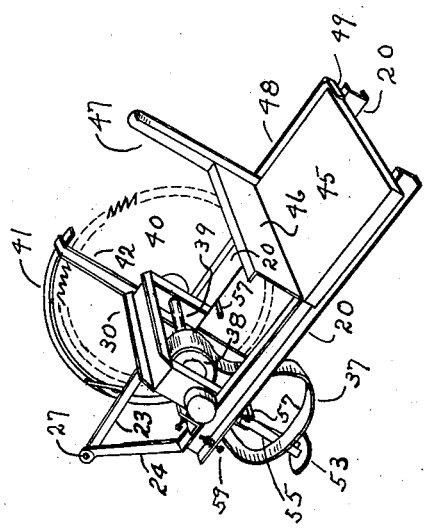
INVENTOR.
CLARENCE B. RICHEY
BY
ATTORNEY Aug. 31, 1948.  C. B. RICHEY  2,448,123
CIRCULAR SAW ATTACHMENT FOR TRACTORS
Filed June 20, 1945  2 Sheets-Sheet 2

INVENTOR.
CLARENCE B. RICHEY
BY
ATTORNEY

Patented Aug. 31, 1948

2,448,123

UNITED STATES PATENT OFFICE 2,448,123

CIRCULAR SAW ATTACHMENT FOR TRACTORS

Clarence B. Richey, Quincy, Ill., assignor to Electric Wheel Company, Quincy, Ill., a company of Illinois Application June 20, 1945, Serial No. 600,618

3 Claims. (Cl. 143—43)

The present invention relates to an attachment for direct and detachable connection to a conventional tractor and has for its objects generally stated providing a simple, light, easily attached and detached attachment which is efficient, durable and can be manufactured at low cost.

An object of the present invention is to provide an attachment particularly adapted to carry a conventional circular saw with a conventional work table.

The principal object of the present invention is to utilize the standard equipment of a certain well known tractor or an equivalent, whereby the draw-bars and a linkage form the attaching members in cooperation with the power lift and a power take-off as the driving means for the device.

An important object of the present invention is to provide means whereby the device which, when detached, is left on the ground in a convenient position, so the tractor may be backed up to the device, the belt placed on the tractor pulley and the draw-bars attached and then the device may be lifted from the rear end for convenient connection of a forwardly extending linkage on the device to a bracket on the tractor.

Another object of the invention is to first use the rear end of the draw-bars as a pivotal point for the frame and provide adjustable stops on the frame which rest on the tops of the drawbars forward of this pivot when the frame is lifted from the rear end, whereby the opening in the linkage may be moved into alignment with an opening in a bracket on the tractor for a convenient pin attachment thereto, thus to complete a rigid fastening of the frame to the tractor which cooperates with the power lift to prevent side swinging or tipping of the frame.

A still further object of the present invention is to provide a mandrel carrying yoke which is rigidly and slidably connected to the side frame members of the device having screw-threaded means for moving the yoke on the frame for tightening the belt and for adjusting the running position of the belt on the pulleys.

Another object of my invention is to provide a device which remains clear of the ground when attached and is sufficiently rigid in its fastenings to the tractor so it is at all times in position for use or transportation.

Fig. 1 is a side elevational view of my invention attached to a conventional tractor, a fraction of the tractor only being shown.

Fig. 2 is a perspective view of my device resting on the ground and in a position ready to be attached to the tractor.

Figure 3:
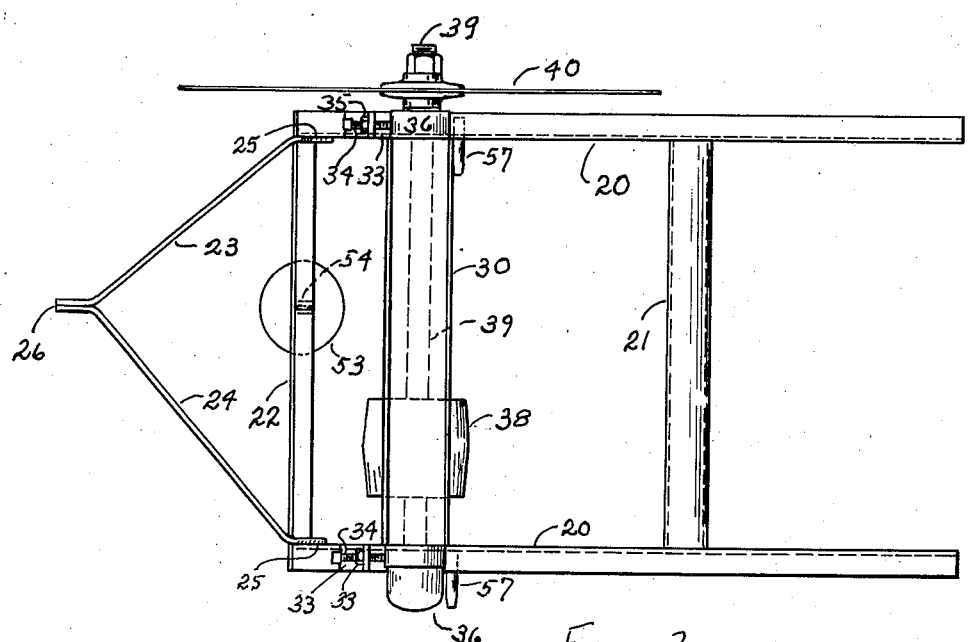
Fig. 3 is a top view of the device as shown in Figure 2, less the work holding table and saw shield.

As thus illustrated the tractor is designated by reference character A, having a power lift (not shown) mounted within the frame of the tractor with a shaft 10 which protrudes through opposite sides of the tractor frame, and having arms 11—11 secured to the protruding ends and rearwardly extending draw-bars 12—12 which are hingedly secured to opposite sides of the tractor as at 13—13. Operating connections between arms 11 and draw-bars 12 are made by links 14—14. A housing 15 is secured to the rear end of the tractor into which the power take-off shaft extends. Member 15 has a transverse projection (not shown) into which another shaft is rotatably mounted, this other shaft and the power take-off shaft being operatively connected by suitable bevel gears. A belt pulley 16 is secured to the outer end of the other shaft.

My device comprises a main frame consisting of spaced channel bars 20—20 and being secured together by means of cross members 21 and 22. On the forward ends of members 20 I secure, preferably by electric welding, converging bars 23 and 24. These bars are secured together as at 26 and having registering openings 27.

I provide an inverted U-shaped yoke 30 which is held at its lower ends to members 20 by means of bolts 31—31, members 20 having slots 32—32 through which the bolts extend so this member may be adjusted longitudinally on members 20 for a purpose which will hereinafter appear.

I provide brackets 33—33 which are secured to members 20 as illustrated, each having screw-threaded therein a bolt 34 with a lock nut 35, whereby the yoke may be moved to the desired position on members 20 after bolts 31 have been loosened slightly. I rotatably mount a shaft 39 in yoke 30 by means of bearings 36—36, the ends of bolts 34 resting against these bearings; thus it will be seen that when bolts 31 are made taut after yoke 30 has been moved to a desired position by means of bolts 34, the yoke will be firmly held into position. Furthermore by the proper adjustment of bolts 34 the driving belt 37 may be caused to travel centrally on pulleys 38 and 16, pulley 38 being mounted on shaft 39, as illustrated. I mount a circular saw 40 on shaft 39 having a shield 41 for its forward side which is anchored to members 20 and 30 by means of bars 42—42. A work table 45 is longitudinally movable on members 20 having a shield 46 and a yoke 47, the outer portion 48 of which is secured to member 45 as at 49, thus leaving a space adjacent the end of member 45 between which the saw 40 may travel.

The piece to be sawed is laid on work table 45 and against shield 46 and the piece and work table pushed forward; member 48 answering as a rest for the outer end of the piece being sawed. It will be understood that member 45 has suitable guides to maintain it in its moving position and that any known means may be used for reducing the friction between members 45 and 20.

Figure 4:
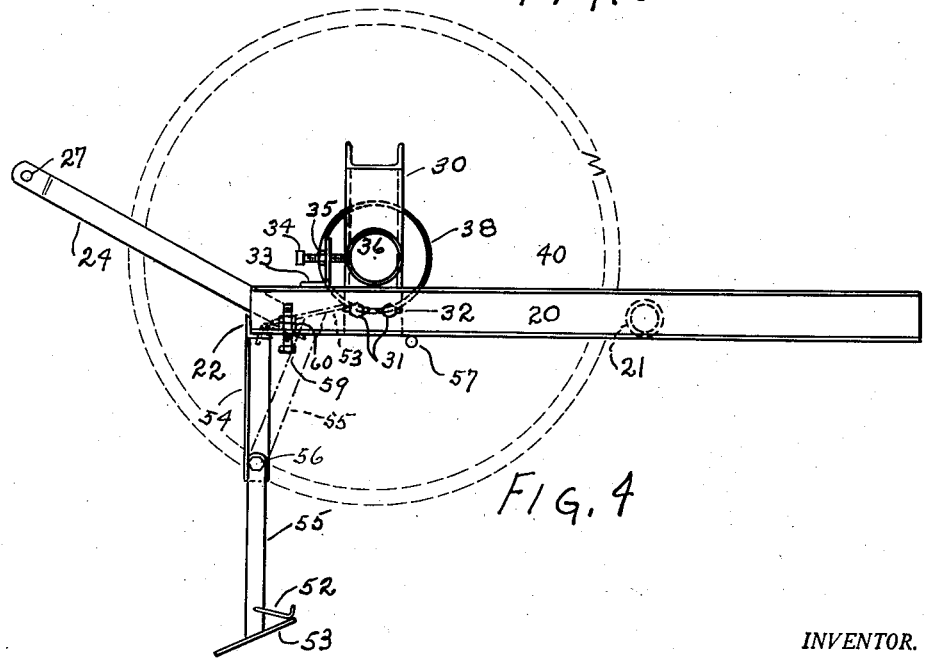
Fig. 4 is a side elevational view of the device as shown in Figures 2 and 3.

One of the novel features of applicant's device is the manner of connecting and disconnecting it from the tractor. Figures 2 and 4 illustrate the device when disconnected and resting on the ground. For holding the device in the position shown on the ground I provide a bracket 54 (see Figure 4) which is secured to member 22 having hingedly secured to its lower end an arm 55 as at 56. On the lower end of arm 55 I secure a plate 53 adapted to rest on the ground when the rear members 20 are resting on the ground, thus providing a three point support.

Pivotal studs 57 project outwardly from members 20 and are secured to these members in the position about as shown in Figures 2, 3 and 4. To attach the device to the tractor, the tractor may be backed to a position so belt 37 can be placed on pulley 16 and studs 57 then moved into openings 58 in the rear ends of draw-bars 12.

I provide cap screws 59—59 which are screw-threaded into the lower flange of members 20 about in the position shown in the figures, having lock nuts 60. When members 59 are suitably adjusted the rear end of the device may be lifted using studs 57 as an axis until members 59 rest on the draw-bars and the device lifted until openings 27 on the ends of members 23 and 24 register with an opening in bracket 61 on the tractor and the connection made by means of a bolt 62. Thus the device and draw-bars are lifted as a unit on pivots 13 as an axis. In lifting the rear end of the device for making the connection to bracket 61 the power lift will adjust itself to the movement necessary for this operation or if necessary the power lift may be operated to facilitate the lifting and connecting operations.

It will be seen that after the connection to bracket 61 by means of a bolt 62 has been made, the device will be rigidly held to the tractor and that bolts 31 may be loosened slightly and that bolts 34 may be used for adjusting the tautness of the belt and for maintaining the belt in its operating position; that because of the connection of each draw-bar to shaft 10 the device will be held firmly from tipping sidewise; furthermore the device will be held firmly from moving sidewise by its connection to the tractor as at 61.

After the device has been attached to the tractor, member 53 will be out of contact with the ground surface and member 55 may then be turned to the position shown by dotted lines in Figure 4 and held in this position by means of a hook 52 as illustrated in this figure.

I have shown the preferred embodiment of my invention. It will be understood that many minor detailed changes may be made without departing from the spirit and scope of the invention as recited in the appended claims.

Having thus shown and described my invention

I claim:

1. In combination with a tractor having a power take-off with a transversely positioned belt wheel operatively connected thereto, draw bars having their front ends hingedly connected to opposite sides of the tractor and below the horizontal plane of the axles of the tractor, a frame hingedly connected on opposite sides to the rear end of said bars, a transversely positioned shaft rotatably mounted on said frame having a belt pulley secured thereto and in alignment with said first belt pulley, and a belt forming an operating connection therebetween, said frame having forwardly extending members adapted to be detachably secured to the upper rear end of the tractor, adjustable stops on said frame positioned a distance from the rear end of said drawbar hinges and providing means whereby the stops may act to limit the upward movement of the forward end of said bars relative to the frame, whereby the rear end of said frame may be lifted until the forward ends of said forwardly extending members are in a position to be secured to the tractor, and whereby when said forwardly extending members are secured to the tractor the frame will be rigidly secured to the tractor.

2. In combination with a tractor having a power take-off at its rear end with a transversely positioned belt pulley, a frame, rearwardly extending drawbars having their front ends hingedly connected to opposite sides of the tractor below the axles thereof, and their rear ends being hingedly connected to opposite sides of the frame, a transversely positioned shaft rotatably mounted on said frame, a belt pulley secured to said shaft and positioned in alignment with said first belt pulley and a belt forming an operating connection therebetween, a circular saw secured to one end of said shaft, a work table mounted for movement longitudinally on the frame for moving the work into the saw, said frame having forwardly and upwardly extending links secured to the front ends thereof, their front ends being detachably secured to the tractor a distance above the horizontal plane of the axles of the tractor, adjustable stops on said frame a distance forward of the rear ends of the draw-bars and adapted to lie on the drawbars when the frame is lifted from its rear end, whereby the front ends of said links may be caused to register with an opening on the tractor for said detachable connection.

3. In combination with a tractor, having a power lift, bars having their front ends hingedly connected to opposite sides of the tractor, and below the horizontal plane of the axles of the tractor, a frame hingedly connected on opposite sides to the rear ends of said bars, said frame having forwardly extending members adapted to be detachably secured to the upper rear end of the tractor, adjustable stops on said frame, positioned a distance from the rear end of the drawbar hinges and providing means whereby the stops may act to limit the upward movement of the forward end of said bars relative to the frame, whereby said frame may be lifted from its rear end until the forward ends of said forwardly extending members are in a position to be secured to the tractor, and whereby when said forwardly extending members are secured to the tractor the frame will be rigidly mounted on the tractor, links forming connections from said power lift to said bars intermediate the ends of the bars whereby the power lift may be used to assist in positioning the forward end of the frame for attachment to the tractor, the rearward end of said frame having an adjustable ground rest, adapted to cooperate with the rear end of the frame to hold the frame in a convenient position on the ground for connection to the rear ends of the bars.

CLARENCE B. RICHEY.

REFERENCES CITED

The following references are of record in the file of this patent:

UNITED STATES PATENTS

| Number | Name | Date |
|---|---|---|
| 1,284,262 | Druessel | Nov. 12, 1918 |
| 1,484,923 | Zander | Feb. 26, 1924 |
| 1,488,976 | Cayford | Apr. 1, 1924 |
| 1,499,031 | Richey | June 24, 1924 |
| 1,517,732 | Johnson | Dec. 2, 1924 |
| 1,586,797 | Gulliford | June 1, 1926 |
| 2,181,047 | Collett | Nov. 21, 1939 |
| 2,350,880 | Dellinger et al. | June 6, 1944 |